US012762798B2

(12) United States Patent
Lee et al.

(10) Patent No.: US 12,762,798 B2
(45) Date of Patent: Oct. 13, 2026

(54) IMAGING METHOD FOR VIDEO CONFERENCE, ELECTRONIC DEVICE AND VIDEO CONFERENCE SYSTEM

(71) Applicant: Acer Incorporated, New Taipei City (TW)

(72) Inventors: Chi-Kang Lee, New Taipei City (TW); Wen-Cheng Hsu, New Taipei City (TW); Shih-Hao Lin, New Taipei City (TW); Hsi Lin, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 116 days.

(21) Appl. No.: 18/773,091

(22) Filed: Jul. 15, 2024

(65) Prior Publication Data

US 2025/0078409 A1 Mar. 6, 2025

(30) Foreign Application Priority Data

Sep. 5, 2023 (TW) ................................ 112133672

(51) Int. Cl.
*G06T 17/20* (2006.01)
*G06T 7/73* (2017.01)
(Continued)

(52) U.S. Cl.
CPC ................ *G06T 17/20* (2013.01); *G06T 7/75* (2017.01); *G06T 15/20* (2013.01); *G06T 15/506* (2013.01);
(Continued)

(58) Field of Classification Search
CPC ....... G06T 19/006; G06T 19/20; G06T 17/00; G06T 17/20; G06T 2207/10016;
(Continued)

(56) References Cited

U.S. PATENT DOCUMENTS

2019/0096139 A1 3/2019 Chu
2021/0360197 A1* 11/2021 Oz ........................... G06T 7/73
(Continued)

FOREIGN PATENT DOCUMENTS

CN 107203962 A 9/2017
CN 109859307 A 6/2019
(Continued)

OTHER PUBLICATIONS

Fadzli FE, Ismail AW, Abd Karim Ishigaki S. A systematic literature review: Real-time 3D reconstruction method for telepresence system. Plos one. Nov. 15, 2023;18(11):e0287155 (Year: 2023).*

*Primary Examiner* — Xiao M Wu
*Assistant Examiner* — Scott E Sonners
(74) *Attorney, Agent, or Firm* — Birch, Stewart, Kolasch & Birch, LLP

(57) ABSTRACT

An imaging method, an electronic device and a video conference system are provided. The imaging method is used for performing video conference on a display. The imaging method includes the following steps. At least one video conference stream is received. When a 3D modeling command is received, a plurality of 2D frames shown on the display are captured. Based on the 2D frames, at least one 3D model is built. When a rendering command corresponding to a viewing angle information is received, an adjusted image corresponding to the viewing angle information is rendered according to at least one 3D model.

15 Claims, 5 Drawing Sheets

(51) Int. Cl.

| | |
|---|---|
| ***G06T 15/20*** | (2011.01) |
| ***G06T 15/50*** | (2011.01) |
| ***G06T 17/00*** | (2006.01) |
| ***H04L 12/18*** | (2006.01) |
| ***H04N 7/15*** | (2006.01) |

(52) U.S. Cl.
CPC .......... *G06T 17/00* (2013.01); *H04L 12/1813* (2013.01); *H04N 7/15* (2013.01); *G06T 2200/08* (2013.01); *G06T 2200/16* (2013.01)

(58) Field of Classification Search
CPC ....... G06T 2207/10028; G06T 2200/24; G06T 15/20; G06T 19/00; G06T 15/04; G06T 7/70; G06T 13/40; G06T 2219/2016; G06T 7/73; G06T 19/003; G06T 2219/2004; G06T 15/005; G06T 7/596; G06F 3/011; G06F 3/04815; G06F 3/017; G06F 3/0484; G06F 3/016; G06F 30/00; G06F 16/583; G06F 2212/455; G06V 20/52; G06V 10/141; G06V 20/40; H04N 7/157; H04N 19/597; H04N 21/23418; H04N 13/351
See application file for complete search history.

(56) References Cited

U.S. PATENT DOCUMENTS

| | | | | |
|---|---|---|---|---|
| 2022/0172424 | A1 * | 6/2022 | Vircíková | G06N 3/045 |
| 2025/0245898 | A1 * | 7/2025 | Lorrain | G06T 7/579 |

FOREIGN PATENT DOCUMENTS

| | | | |
|---|---|---|---|
| CN | 110035270 | A | 7/2019 |
| CN | 116543247 | A | 8/2023 |

* cited by examiner

IMAGING METHOD FOR VIDEO CONFERENCE, ELECTRONIC DEVICE AND VIDEO CONFERENCE SYSTEM

This application claims the benefit of Taiwan application Serial No. 112133672, filed Sep. 5, 2023, the subject matter of which is incorporated herein by reference.

BACKGROUND OF THE INVENTION

Field of the Invention

The invention relates in general to a processing method, an electronic device and an electronic system, and more particularly to an imaging method, an electronic device and a video conference system.

Description of the Related Art

Along with the advance of video technology, people can perform remote video communication and discussion using video conference software. During the video conference, by activating the lens, the speaker can send his/her image to each participant.

During the video conference, the speaker can show the participants a particular object, the indoor environment, or a beautiful scenery through the lens. For the participants to view the complete appearance of the object, the speaker can rotate the object or shoot around the object. Although the speaker has tried all his/her best to shoot every detail of the object, the participant may still want to carefully check the object from a particular angle but is unable to keep asking the speaker to show the object again from the desired angle. Therefore, it has become a prominent task for the industry to provide a technology allowing the participant to actively adjust the angle of the object without having to ask the speaker to show the object again.

SUMMARY OF THE INVENTION

The invention is directed to an imaging method, an electronic device and a video conference system. During a video conference, the video conference stream can be displayed on a display. Furthermore, a 3D model can be built at the local end based on the 2D frames displayed on the display, and an adjusted image corresponding to a particular viewing angle information can be rendered according to the 3D model. Regardless of the rotation angle of the speaker with respect to an object, each participant can independently rotate the object within the imaging window W2 as if the participant were on site holding the object at hand.

According to one embodiment of the present invention, an imaging method is provided. The imaging method is used for performing video conference on a display. The imaging method includes the following steps. At least one video conference stream is received. When a 3D modeling command is received, a plurality of 2D frames shown on the display are captured. Based on the 2D frames, at least one 3D model is built. When a rendering command corresponding to a viewing angle information is received, an adjusted image corresponding to the viewing angle information is rendered according to at least one 3D model.

According to another embodiment of the present invention, an electronic device is provided. The electronic device includes a transmission module, a display and a processing module. The transmission module is used for receiving at least one video conference stream. The display is used for displaying the video conference stream. The processing module includes a frame capturing unit, a modeling unit and an imaging unit. When a 3D modeling command is received, the frame capturing unit captures a plurality of 2D frames shown on the display. The modeling unit is used for building at least one 3D model based on the 2D frames. When a rendering command corresponding to a viewing angle information is received, the imaging unit displays an adjusted image corresponding to the viewing angle information according to the 3D model.

According to an alternate embodiment of the present invention, a video conference system is provided. The video conference system includes a first electronic device and a second electronic device. The first electronic device is used for capturing at least one video conference stream and uploading it to a network. The second electronic device includes a transmission module, a display and a processing module. The transmission module is used for receiving a video conference stream through the network. The display is used for displaying the video conference stream. The processing module includes a frame capturing unit, a modeling unit and an imaging unit. When a 3D modeling command is received, the frame capturing unit captures a plurality of 2D frames shown on the display. The modeling unit is used for continuously building at least one 3D model based on the 2D frames. When a rendering command corresponding to a viewing angle information is received, the imaging unit displays an adjusted image corresponding to the viewing angle information according to the 3D model.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
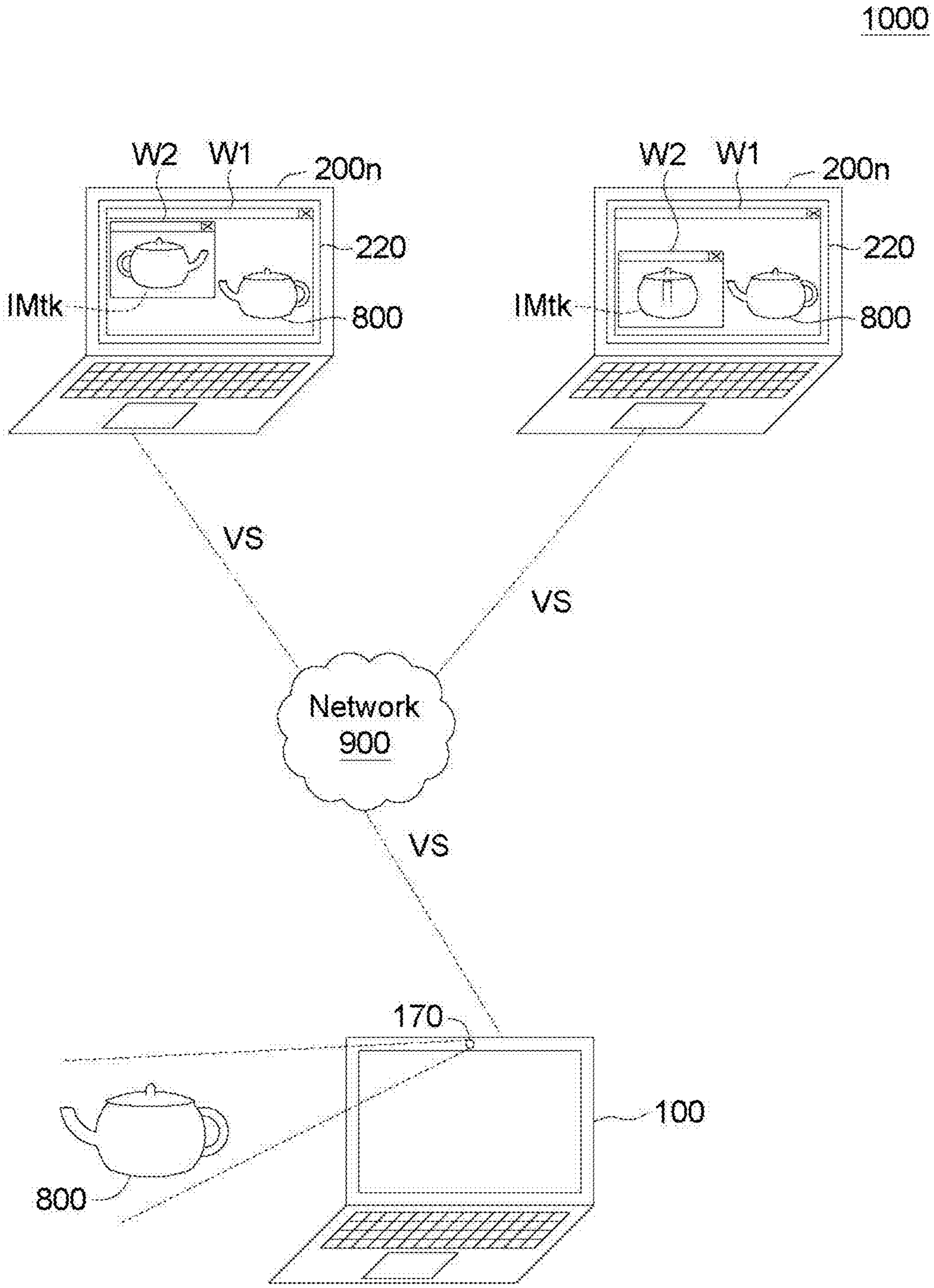
FIG. 1 is a schematic diagram of a video conference system according to an embodiment.

Referring to FIG. 1, a schematic diagram of a video conference system 100 according to an embodiment is shown. The video conference system 1000 includes a speaker's electronic device 100 and a participant's electronic device **200*n*. During the video conference, the speaker's electronic device 100 and the participant's electronic device 200*n* can perform remote video communication and discussion through a network 900. The speaker can show an object 800 before a lens 170. The lens 170 can be realized by such as a front lens of the electronic device 100, a lens of a mobile phone connected to the electronic device 100, or an external lens. For the participant to view the complete appearance of the object 800, the speaker can rotate the object 800 or shoot around the object 800**.

The video conference stream VS is instantly transferred from the speaker's electronic device 100 to the electronic device 200_n_. The video conference window W1 shown on the display 220 of the participant's electronic device 200_n_ will continuously display the video conference stream VS.

In the present embodiment, the participant's electronic device 200_n_ can display an adjusted image IMtk of the object 800 on the imaging window W2. The imaging window W2 can be superimposed on the video conference window W1. Regardless of the rotation angle of the speaker with respect to an object 800, each participant can independently rotate the object 800 within the imaging window W2 using a mouse or a keyboard as if the participant were on site holding the object 800 at hand.

What is displayed on the video conference window W1 is the synchronized video conference stream VS, and what is displayed on the imaging window W2 is the part or position of the object 800 which the participant is interested in. The participant can choose the part or position of the object 800 by adjusting the rotation angle of the rotation angle of the object 800.

Figure 2:
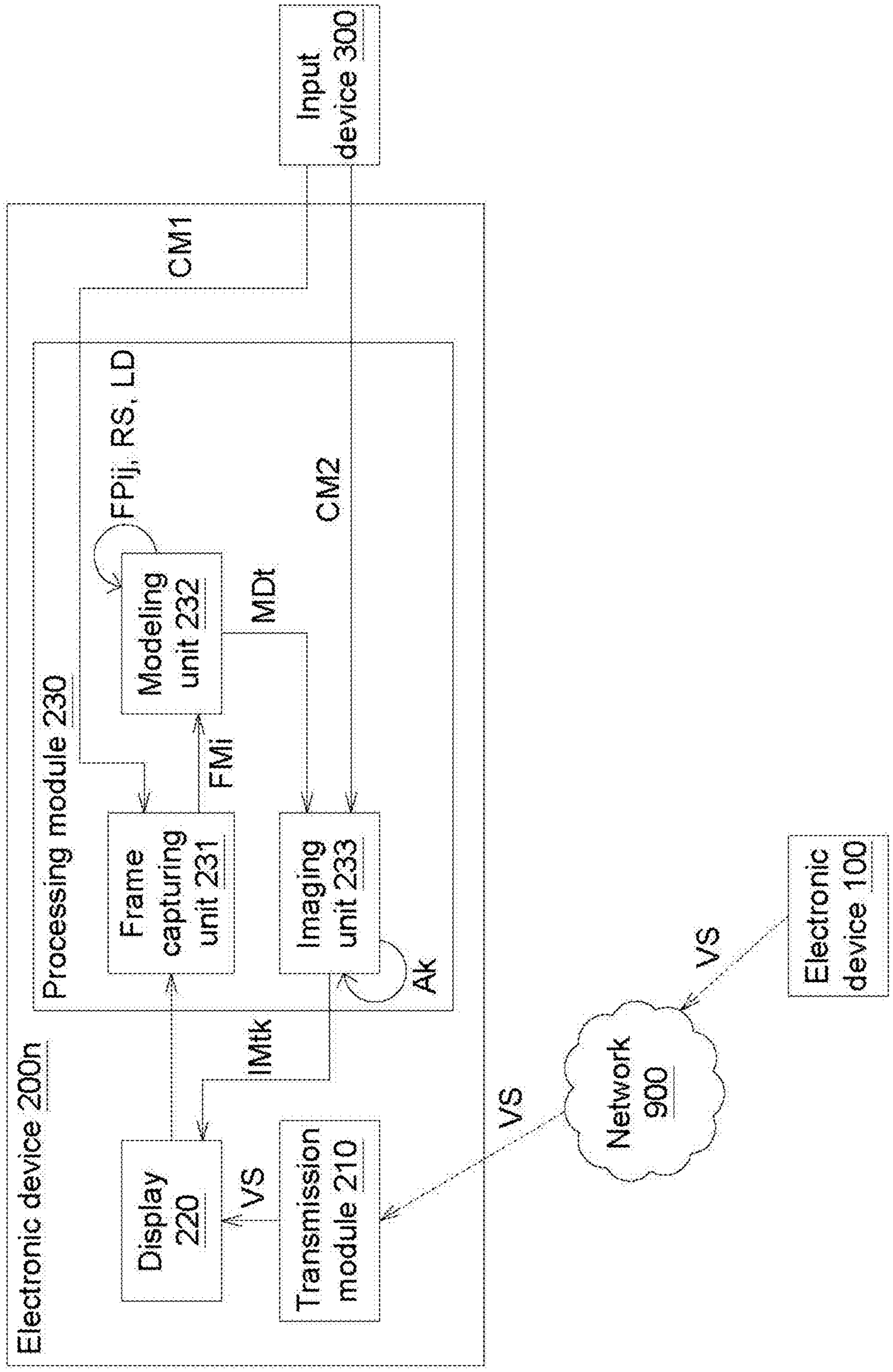
FIG. 2 is a block diagram of a speaker's electronic device and a participant's electronic device according to an embodiment.

Referring to FIG. 2, a block diagram of a speaker's electronic device 100 and a participant's electronic device 200_n_ according to an embodiment is shown. The electronic device 200_n_ includes a transmission module 210, a display 220 and a processing module 230. The transmission module 210 is used for transferring data, and can be realized by such as a cabled network module, a wireless network module or an LTE module. The display 220 is used for displaying frames and data, and can be realized by such as an LCD display, an OLED display or an e-paper display. The processing module 230 is used for performing various processing and control procedures, and can be realized by such as a chip, a circuit, a circuit board or a storage device storing programming codes. The processing module 230 includes a frame capturing unit 231, a modeling unit 232 and an imaging unit 233. The frame capturing unit 231 is used for capturing the frames of the display 220. The modeling unit 232 is used for performing a 3D model building procedure. The imaging unit 233 is used for rendering desired frames. The frame capturing unit 231, the modeling unit 232 and/or the imaging unit and imaging unit 233 can be realized by such as a chip, a circuit, a circuit board or a storage device storing programming codes. In the present embodiment, after receiving a video conference stream VS, the transmission module 210 can display the video conference stream VS on the display 220. The processing module 230 at the local end can directly build a 3D model MD based on the 2D frames displayed on display 220 and form an adjusted image IMtk corresponding to a particular viewing angle information Ak. Details of the operations of each element are disclosed below with an accompanying flowchart.

Figure 3:
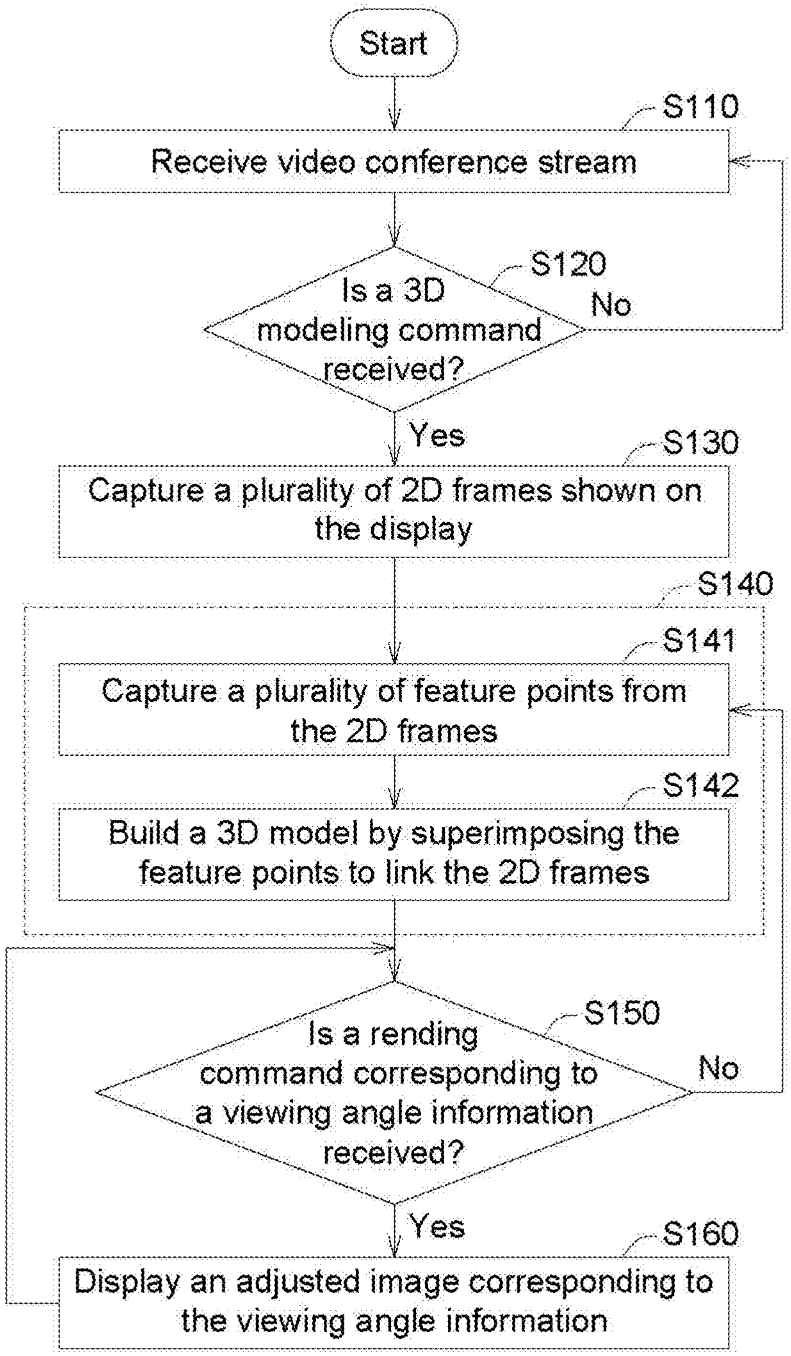
FIG. 3 is a flowchart of an imaging method according to an embodiment.

Referring to FIG. 3, a flowchart of an imaging method according to an embodiment is shown. First, the method begins at step S110, a video conference stream VS is received by an electronic device 200_n_. In the present step, the video conference stream VS is directly received from a network 900; the content of the video conference stream VS is not stored in the electronic device 200_n_; rather, the content is decoded, then is adjusted based on the parameters corresponding to the display 220 and directly displayed on the display 220. The video conference stream VS received by each electronic device 200_n_ is identical. However, since the hardware parameters (such as the dimension and resolution) and display parameters (such as color temperature and chroma) of the display 220 vary from one electronic device 200_n_ to another electronic device 200_n_, the frames displayed on the display 220 will vary with the electronic device 200_n_.

Then, the method proceeds to step S120, whether a 3D modeling command CM1 is received is determined by the frame capturing unit 231 of the processing module 230. The 3D modeling command CM1 can be triggered by an input device 300. The input device 300 can be realized by such as a mouse, a keyboard or a microphone. For instance, a participant can use a mouse to move the cursor to a model building button on the frame, then click the model building button to trigger a 3D modeling command CM1. Or, the participant can press a quick key combination on the keyboard to trigger the 3D modeling command CM1. Or, the participant can input a particular segment of voice through the microphone to trigger the 3D modeling command CM1. If it is determined that the 3D modeling command CM1 is received, the method proceeds to step S130.

In the present embodiment, even when the method has proceeded to step S130, step S110 continues to be performed.

In step S130, a plurality of 2D frames FMi of the display 220 are captured by the frame capturing unit 231. The 2D frames FMi can be the entire frame of the display 220, the frame of a video conference window W1, or the frame of a video sub-window within the video conference window W1. The frame capturing unit 231 captures the 2D frames FMi at a specific capture frequency. The capture frequency does not have to be identical to the display frequency of the video conference stream.

Then, the method proceeds to step S140. In the present embodiment, even when the method has proceeded to step S140, step S110 and step S130 continue to be performed.

In step S140, at least one 3D model MDt is built by the modeling unit 232 of the electronic device 200_n_ based on the 2D frames FMi. Step S140 includes step S141 and step S142. In step S141, a plurality of feature points FPij are captured from the 2D frames FMi by the modeling unit 232 of the electronic device 200_n_.

Then, in step S142, the feature points FPij are superimposed by the modeling unit 232 of the electronic device 200_n_ to link the 2D frames FMi. After the 2D frames FMi are linked, the 3D model MDt can be built using triangular mesh technology.

When step S140 is being performed, step S110 and step S130 continue to be performed, therefore the electronic device 200_n_ will accumulate more 2D frames FMi. Generally speaking, the large the quantity of 2D frames FMi, the higher the delicacy of the 3D model MDt.

In the present step, the modeling unit 232 of the electronic device 200_n_ will build a relative angle relationship RS in the 3D model MDt. The relative angle relationship RS defines the angles of pitch, yaw and rolling.

Besides, the modeling unit 232 of the electronic device 200_n_ can build a light source direction LD. The light source direction LD is a particular direction in the 3D space.

Then, the method proceeds to step S150, whether a rendering command CM2 corresponding to a viewing angle information Ak is received is determined by the imaging unit 233 of the electronic device 200_n_. The rendering command CM2 can be provided by an input device 300. For instance, the input device 300 can be realized by such as a mouse, a keyboard or a microphone. For instance, the participant can use the mouse to click the object 800, then rotate the object 800 to generate a rendering command CM2 corresponding to a particular viewing angle information Ak. Or, the participant can press the directional key on the keyboard to generate a rendering command CM2 corresponding to a particular viewing angle information Ak. Or, the participant can input a particular segment of voice to generate a rendering command CM2 corresponding to a particular viewing angle information Ak through the microphone. If it is determined that the rendering command CM2 is received, the method proceeds to step S160.

Then, the method proceeds to step S160. In the present embodiment, even when the method has proceeded to step S160, step S110, step S130 and step S140 continue to be performed.

In step S160, an adjusted image IMtk corresponding to the viewing angle information Ak is rendered according to the 3D model MDt of the electronic device 200n then is displayed on the imaging window W2 by the imaging unit 233. In the present step, the imaging unit 233 of the electronic device 200n can show light and shadow on the adjusted image IMtk according to the light source direction LD.

Figure 4:
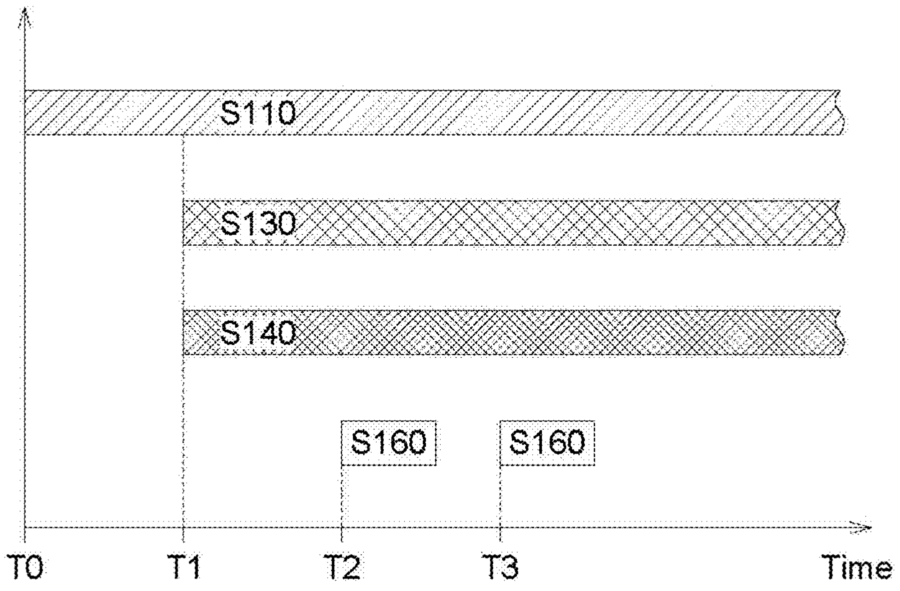
FIG. 4 is a timing diagram of the steps S110, S130, S140, S160 of FIG. 3.

Referring to FIG. 4, a timing diagram of the steps S110, S130, S140, S160 of FIG. 3 is shown. From time point TO, the step S110 of receiving the video conference stream VS continues to be performed without being interrupted. From time point T1 at which a 3D modeling command CM1 is received, the step S130 of capturing the 2D frames FMi and the step S140 of building a 3D model MDt continue to be performed. Along with the progressing of the time, more 2D frames FMi are captured, and the 3D model MDt become more delicate and clearer. At time point T2 at which a rendering command CM2 is received, step S160 is temporarily performed to render an adjusted image IMtk. At time point T3 when another rendering command CM2 is received, step S160 will also be temporarily performed to render another adjusted image IMtk. Along with the progressing of the time, the later the adjusted image IMtk is rendered, the clearer the image will be.

In the present embodiment, the step S130 of capturing the 2D frames FMi, the step S140 of building the 3D model MDt and the step S160 of rendering the adjusted image IMtk are performed concurrently. Therefore, although the rendering command CM2 has been already received by the participant's electronic device 200n for long, the adjusted image IMtk still can be smoothly rendered with a certain degree of clarity.

Figure 5:
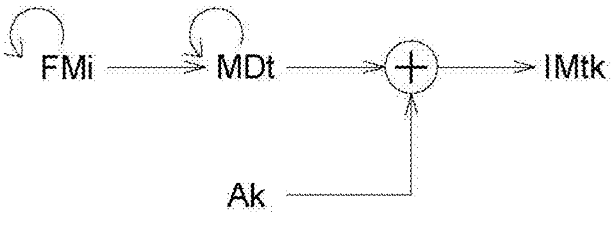
FIG. 5 exemplifies an instant 3D imaging process.

Referring to FIG. 5, an instant 3D imaging process is exemplified. The 2D frames FMi continue to be collected and accumulated. The electronic device 200n can continuously build a 3D model MDt according to the collected 2D frames FMi. As the 2D frames FMi are continuously accumulated, the 3D model MDt is continuously corrected. Once the 3D model MDt is built, an adjusted image IMtk corresponding to the viewing angle information Ak can then be generated according to the viewing angle information Ak.

Figure 6:
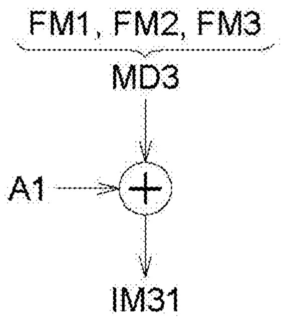
FIGS. 6 to 8 exemplify 3D imaging processes at different time points.

Referring to FIGS. 6 to 8, 3D imaging processes at different time points are exemplified. As indicated in FIG. 6, when only 3 2D frames FM1, FM2, and FM3 are collected, the electronic device 200n can build a 3D model MD3 according to the collected 2D frames FM1, FM2, and FM3. Then, an adjusted image IM31 corresponding to the viewing angle information A1 can be generated according to the viewing angle information A1.

Figure 7:
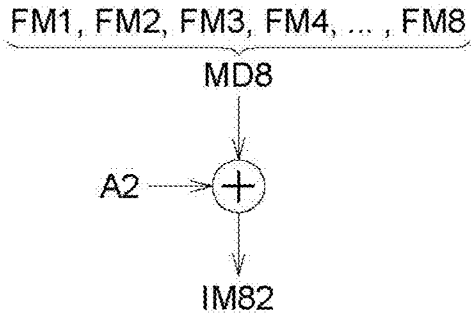

As indicated in FIG. 7, when 8 2D frames FM1, FM2, FM3, FM4, . . . , and FM8 are collected, the electronic device 200n can build a 3D model MD8. Then, according to the viewing angle information A2, an adjusted image IM82 corresponding to the viewing angle information A2 can be generated according to the 8 collected 2D frames FM1, FM2, FM3, FM4, . . . , and FM8.

Figure 8:
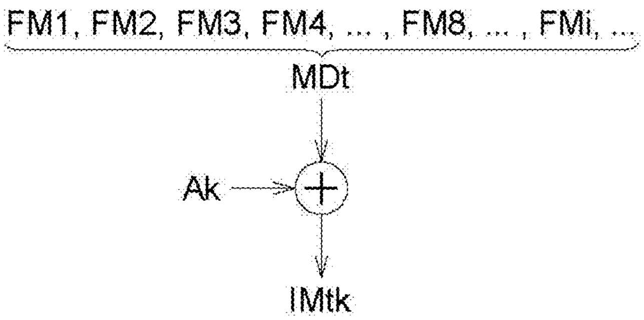

As indicated in FIG. 8, when a plurality of 2D frames FM1, FM2, FM3, FM4, FM8, . . . , FMi, . . . are collected, the electronic device 200n can build a 3D model MDt according to the 2D frames FM1, FM2, FM3, FM4, . . . , FM8, . . . , FMi, . . . that have been collected. Then, an adjusted image IMtk corresponding to the viewing angle information Ak can be generated according to the viewing angle information Ak.

Refer to the examples indicated in FIGS. 6 to 8. Along with the progressing of the time, as more 2D frames FMi are captured, the 3D model MDt will become more dedicate, and so will the generated adjusted image IMtk become clearer and clearer.

According to the above embodiments, during a video conference, the video conference stream VS can be displayed on the display 220. Furthermore, a 3D model MDt can be built at the local end based on the 2D frames displayed on the display 220, and an adjusted image IMtk corresponding to a particular viewing angle information Ak can be rendered according to the 3D model MDt. Regardless of the rotation angle of the speaker with respect to an object 800, each participant can independently rotate the object 800 within the imaging window W2 as if the participant were on site holding the object 800 at hand.

While the invention has been described by way of example and in terms of the preferred embodiment(s), it is to be understood that the invention is not limited thereto. Based on the technical feature points embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. An imaging method used for performing video conference on a display, wherein the imaging method comprises:
  - receiving at least one video conference stream;
  - capturing a plurality of 2D frames shown on the display after the at least one video conference stream is decoded and rendered on the display, when a 3D modeling command is received, wherein the plurality of 2D frames are captured from the display rather than from the at least one video conference stream itself;
  - building at least one 3D model based on the plurality of 2D frames; and
  - rendering an adjusted image corresponding to a viewing angle information according to the at least one 3D model, when a rendering command corresponding to the viewing angle information is received.

2. The imaging method according to claim 1, wherein the at least one video conference stream is directly received from a network.

3. The imaging method according to claim 1, wherein the step of building the at least one 3D model and the step of rendering the adjusted image corresponding to the viewing angle information are performed concurrently.

4. The imaging method according to claim 1, wherein a relative angle relationship is built in the step of building the at least one 3D model.

5. The imaging method according to claim 1, wherein a light source direction is built in the step of building the at least one 3D model.

6. The imaging method according to claim 1, wherein the viewing angle information is adjusted by an input device, and the adjusted image is displayed on an imaging window.

7. The imaging method according to claim 1, wherein the step of building the at least one 3D model comprises:

capturing a plurality of feature points from the plurality of 2D frames; and superimposing the plurality of feature points to link the plurality of 2D frames.

8. An electronic device, comprising:

a transmission module, used for receiving at least one video conference stream;

a display, used for displaying the at least one video conference stream; and a processing module, comprising:

a frame capturing unit, used for capturing a plurality of 2D frames shown on the display after the at least one video conference stream is decoded and rendered on the display when a 3D modeling command is received, wherein the plurality of 2D frames are captured from the display rather than from the at least one video conference stream itself;

a modeling unit, used for building at least one 3D model based on the plurality of 2D frames; and an imaging unit, used for displaying an adjusted image corresponding to a viewing angle information according to the at least one 3D model when a rendering command corresponding to the viewing angle information is received.

9. The electronic device according to claim 8, wherein the transmission module directly receives the at least one video conference stream from a network.

10. The electronic device according to claim 8, wherein the modeling unit builds the at least one 3D model and the imaging unit displays the adjusted image corresponding to the viewing angle information concurrently.

11. The electronic device according to claim 8, wherein the modeling unit is further used for building a relative angle relationship.

12. The electronic device according to claim 8, wherein the modeling unit is further used for building a light source direction.

13. The electronic device according to claim 8, wherein the viewing angle information is adjusted by an input device, and the adjusted image is displayed on an imaging window.

14. The electronic device according to claim 8, wherein the modeling unit is used for capturing a plurality of feature points from the plurality of 2D frames and superimposing the plurality of feature points to link the plurality of 2D frames.

15. A video conference system, comprising:

a first electronic device, used for capturing at least one video conference stream and uploading the at least one video conference stream to a network; and a second electronic device, comprising:

a transmission module, used for receiving the at least one video conference stream through the network;

a display, used for displaying the at least one video conference stream; and a processing module, comprising:

a frame capturing unit, used for capturing a plurality of 2D frames shown on the display after the at least one video conference stream is decoded and rendered on the display when a 3D modeling command is received, wherein the plurality of 2D frames are captured from the display rather than from the at least one video conference stream itself;

a modeling unit, used for building at least one 3D model based on the plurality of 2D frames; and an imaging unit, used for displaying an adjusted image corresponding to a viewing angle information according to the at least one 3D model when a rendering command corresponding to the viewing angle information is received.

* * * * *